(12) United States Patent
Shatzkamer et al.

(10) Patent No.: US 8,605,662 B2
(45) Date of Patent: Dec. 10, 2013

(54) INTELLIGENT REAL ACCESS POINT NAME (APN) SELECTION USING VIRTUAL APNS

(75) Inventors: Kevin Shatzkamer, San Francisco, CA (US); Mark Grayson, Maidenhead (GB); Biswaranjan Panda, Santa Clara, CA (US); Richard Kyle Forster, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1312 days.

(21) Appl. No.: 11/781,192

(22) Filed: Jul. 20, 2007

(65) Prior Publication Data

US 2009/0023426 A1 Jan. 22, 2009

(51) Int. Cl.
*H04W 4/00* (2009.01)

(52) U.S. Cl.
USPC .......................................... 370/329

(58) Field of Classification Search
USPC ......... 370/329, 328, 228, 217, 338, 235, 255, 370/221, 401, 315, 310.2, 331; 455/414.1, 455/436, 438, 439, 444, 449, 440; 726/5; 713/183; 709/228
See application file for complete search history.

(56) References Cited

U.S. PATENT DOCUMENTS

| | | | |
|---|---|---|---|
| 4,843,541 A | 6/1989 | Bean et al. | |
| 5,867,494 A | 2/1999 | Krishnaswamy et al. | |
| 6,154,839 A | 11/2000 | Arrow et al. | |
| 6,233,458 B1 | 5/2001 | Haumont et al. | |
| 6,496,505 B2 | 12/2002 | La Porta et al. | |
| 6,504,839 B2 | 1/2003 | Valentine et al. | |
| 6,545,992 B2 | 4/2003 | Naqvi et al. | |
| 6,608,832 B2 | 8/2003 | Forslow | |
| 6,687,252 B1 | 2/2004 | Bertrand et al. | |
| 6,847,610 B1 | 1/2005 | Suumaki et al. | |
| 6,853,642 B1 | 2/2005 | Sitaraman et al. | |
| 6,898,425 B1 | 5/2005 | Wilhelmsson et al. | |
| 6,973,076 B2 | 12/2005 | Takeda et al. | |

(Continued)

FOREIGN PATENT DOCUMENTS

EP 1246479 10/2002

OTHER PUBLICATIONS

GGSN Release 6.0 Configuration Guide_Cisco IOS Release 12.3(14)YU_July7-2005.pdf.*

(Continued)

*Primary Examiner* — Charles Appiah
*Assistant Examiner* — Alexander Yi
(74) *Attorney, Agent, or Firm* — Patent Capital Group

(57) ABSTRACT

In one embodiment, a first access request is received from a mobile device. The access request may be received through a first access medium for a virtual access point name (APN). A session is created with a service using a first real access point name (APN) for the mobile device. A second access request is received through a second type of access medium. The request may be received through a second virtual APN. A session is determined that is active for the mobile device through the first access medium and the second access request is assigned the first real APN even though the request is received through a second access medium. The continuity of the connection may then be maintained because the first real APN is still being used. In this case, a handoff of the connection from the first access network to the second access network is performed while the connection to the service is maintained through the first real APN.

14 Claims, 7 Drawing Sheets

(56) References Cited

U.S. PATENT DOCUMENTS

| | | |
|---|---|---|
| 7,002,935 B2 | 2/2006 | Kriaras et al. |
| 7,054,833 B1 | 5/2006 | McDonald |
| 7,171,460 B2 | 1/2007 | Kalavade et al. |
| 7,243,134 B2 | 7/2007 | Bruner et al. |
| 7,260,648 B2 | 8/2007 | Tingley et al. |
| 7,380,124 B1 | 5/2008 | Mizell et al. |
| 7,609,682 B2 | 10/2009 | Ang et al. |
| 7,701,947 B2 | 4/2010 | Cunetto et al. |
| 7,734,796 B2 | 6/2010 | Schelen et al. |
| 7,916,701 B1 | 3/2011 | Viswanath et al. |
| 7,920,590 B2 | 4/2011 | Le et al. |
| 2003/0026230 A1 | 2/2003 | Ibanez et al. |
| 2003/0081607 A1 | 5/2003 | Kavanagh |
| 2004/0214576 A1* | 10/2004 | Myers et al. ............ 455/445 |

OTHER PUBLICATIONS

Cisco, "Chapter 7 Configuring Network Access to the GGSN", Cisco GGSN Release 6.0 Configuration Guide, Cisco IOS Release 12.3(14)YU, 58 pages.

ETSI, Universal Mobile Telecommunications System (UMTS); 3GPP System to Wireless Local Area Network (WLAN) Interworking; System Discription (3G99 TS 23.234 Version 7.5.0 Release 7); 86 pages.

U.S. Appl. No. 10/229,461, filed Aug. 27, 2002.

ETSI, "Draft ETSI EN 301 347 v7.3.0 (Jan. 2000); Digital cellular telecommunications system (Phase 2+); General Packet Radio Service (GPRS); GPRS Tunneling Protocol (GTP) across the Gn and Gp interface (GSM 09,60 version 7.3.0 Release 1998)," ©European Telecommunications Standards Institute 2000; 67 pages.

\* cited by examiner

US 8,605,662 B2

INTELLIGENT REAL ACCESS POINT NAME (APN) SELECTION USING VIRTUAL APNS

TECHNICAL FIELD

Particular embodiments generally relate to networking.

BACKGROUND

Conventionally, a mobile device may access data networks by sending network access requests that identify a requested network using an access point name (APN). Different networks are associated with different APNs. For example, a mobile communications network, such as any network using a third or fourth generation wireless technology, may use a first APN and another wireless network, such as a wireless fidelity (WiFi) network, may use a second APN. When a mobile device first connects through a first network, such as a 3GPP network, the mobile device is assigned to the first APN. A service may then be accessed using the first APN.

The mobile device may then connect using a different communication technology. For example, the mobile device may be participating in a call and roam to an area with a WiFi connection. The mobile device may connect to the network through the WiFi connection and is assigned to the second APN because it is using the WiFi network. Because the WiFi APN is a different APN, a session for the call through the first APN is terminated while a new session through the WiFi APN is created. This, however, does not provide call continuity for the mobile device. Rather, if the mobile device was on a voice call, the voice call is terminated when the mobile device attaches to the WiFi network. Thus, a new voice call needs to be made.

DESCRIPTION OF EXAMPLE EMBODIMENTS

Overview

In one embodiment, a first access request is received from a mobile device. The access request may be received through a first access medium for a virtual access point name (APN). A session is created with a service using a first real access point name (APN) for the mobile device. A second access request is received through a second type of access medium. The request may be received through a second virtual APN. A session is determined that is active for the mobile device through the first access medium and the second access request is assigned the first real APN even though the request is received through a second access medium. The continuity of the connection may then be maintained because the first real APN is still being used. In this case, a handoff of the connection from the first access network to the second access network is performed while the connection to the service is maintained through the first real APN.

Example Embodiments

Particular embodiments provide continuity of a connection when a mobile device connects through different access networks. The mobile device may connect to virtual APNs through the different access networks. A real APN is used to connect with a service, such as a data service. This connection may be through a first virtual APN. When a request is received at a second virtual APN through a different access network from a mobile device that has a session active using a real APN, the second virtual APN determines which real APN is servicing the session. The same real APN is then assigned to the request and the connection with the service is maintained. Although two virtual APNs are described it will be understood that the first and second requests may be received at the same virtual APN. However, in both cases, continuity of the connection with the service is maintained even though the mobile device has attached through different data access networks. The session continuity may be maintained by using a network device, such as an authentication, authorization, and accounting (AAA) server, to maintain records about created sessions for the mobile device. The AAA server may be contacted and accounting information is used to determine which session is still active at which real APN for the first access request. The AAA server can then indicate which real APN to assign to the second access request.

Figure 1:
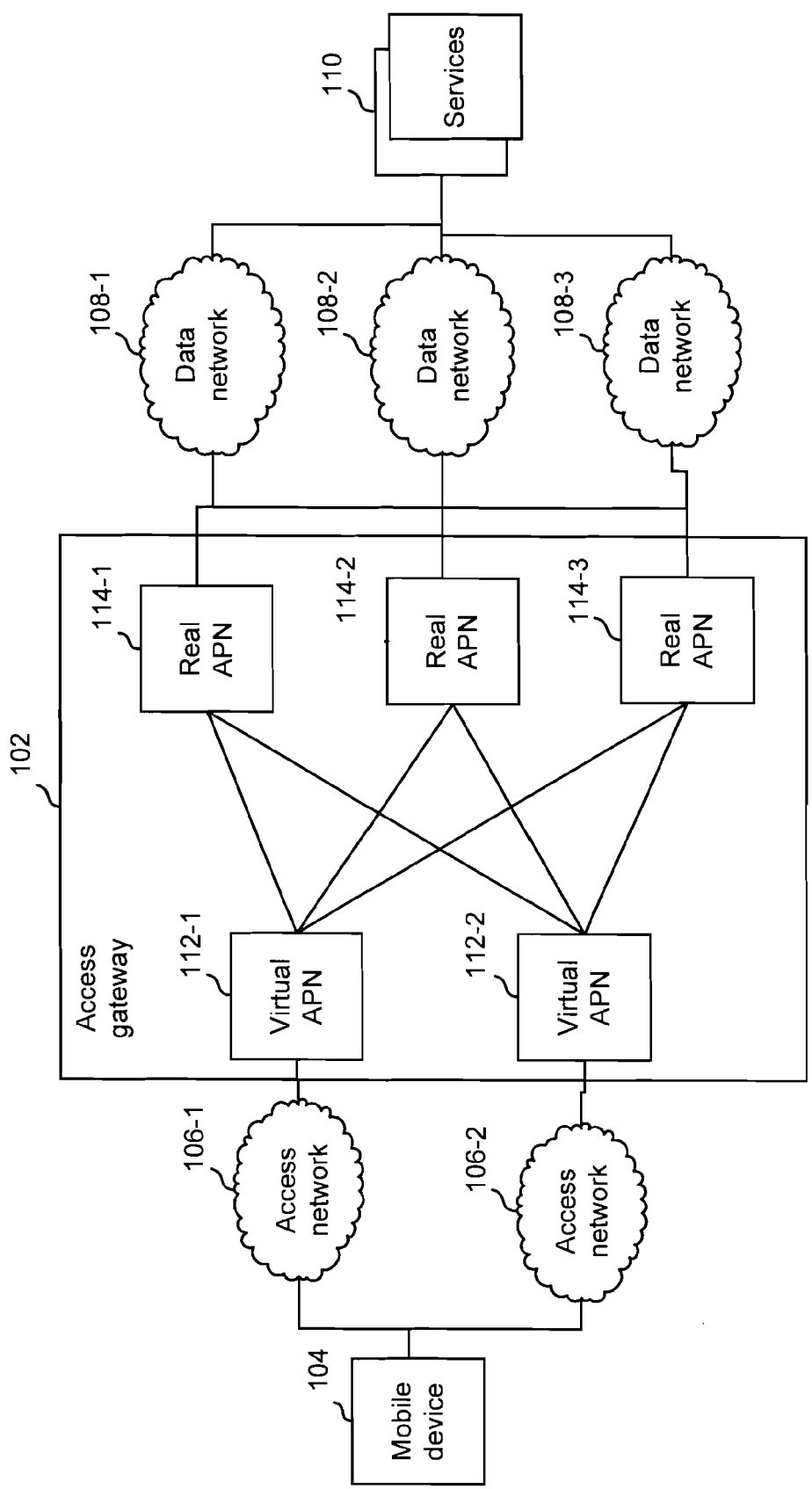
FIG. 1 depicts an example of a system for providing intelligent selection of real access point names (APNs).

FIG. 1 depicts an example of a system for providing intelligent selection of real access point names (APNs). FIG. 1 includes an access gateway 102, a mobile device 104, access networks 106, data networks 108, and services 110. Components of the system support wireless communications and access for mobile devices 104 through data services provided by data networks 108.

Mobile devices 104 support wireless communications and provide access to data services for a user. Mobile devices 104 include cellular phones, personal digital assistants (PDAs), wireless enabled computers, personal e-mail devices, or any other suitable devices for providing wireless access to data networks 108.

Mobile devices 104 may access data networks 108 through access networks 106. Access networks 106 may allow mobile devices 104 access to data networks 108 through different access technologies. For example, access networks 106 may be a radio access network that provides mobile communications through third or fourth generation mobile technologies (3G or 4G). For example, access network 106-1 may be based on a third generation partnership project (3GPP) network, which specifies a third generation mobile phone system. Other technologies may also be appreciated, such as 3GPP2 or any other cellular technology.

Access network 106-2 may provide a different type of access technology. For example, access network 106-2 may be a wireless fidelity (WiFi) network in a wireless local area network (WLAN). Although access networks 106 are described as being wireless networks, it will be understood that access networks 106 may also include other wired networks.

Access gateway 102 may be any network device that allows access to data networks 108. For example, access gateway 102 is a gateway GPRS support node (GGSN). The GGSN is a network node that acts as a gateway between a general packet radio service (GPRS) wireless data network and other networks, such as the Internet, private networks, or other data networks.

Data networks 108 may be any data network that may provide packet based services. Services 110 may be any service that can be provided to mobile device 104. For example, services 110 include voice over Internet protocol (VoIP) services, streaming video services, etc. Different services 110 may be accessed through different data networks 108 in some embodiments.

Mobile devices 104 generate network access requests to access data networks 108. The requests use access point names (APNs) that are assigned to networks. An APN identifies a network that is accessible to mobile device 104. An APN has several attributes associated with it that define how a mobile device 104 can access data network 108 at an access point. The attributes includes which services 110 can be accessed, which features of the service can be access by mobile device 104, etc.

In one embodiment, the APN is pre-configured on mobile device 104. Particular embodiments provide a virtual APN that can be used by mobile device 104 to connect to data networks 108. In one example, mobile device 104 may be configured with one or more virtual APNs depending on the access technology used to access data networks 108. As shown in FIG. 1, two virtual APNs may be used. In this case, mobile device 104 may be pre-configured with two different virtual APNs. However, in other embodiments, any number of virtual APNs may be used, such as a single virtual APN or more than two virtual APNs.

When mobile device 104 wants to access a data network 108, it connects to access network 106. For example, mobile device 104 may first connect through access network 106-1. In one example, this access network may be a mobile communication network, such as a radio access network. Mobile device 104 supplies a virtual APN for access network 106-1, which is sent to access gateway 102. A virtual APN 112-1 is configured to receive the virtual APN access request. This is a virtual APN for mobile communications. In one example, the access request may be sent to an address, such as username@mobileserviceprovider.com. "Username" may be an identifier for the user and "mobileserviceprovider" may be a domain name identifier for a service provider that is providing service to mobile device 104.

Virtual APN 112 is not the real APN that is used. The APN address is preconfigured on mobile device 104 and it is undesirable and hard to reconfigure the APN after the preconfiguration. For example, a user may have to send mobile device 104 back to the service provider to have it reconfigured. Using a virtual APN allows mobile node 104 to send requests to the same virtual APN while access gateway 102 forwards the requests to the real APN. Thus, mobile node 104 does not need any reconfiguration to send requests to different real APNs because the requests are always sent to the virtual APN first. The virtual APN is thus not the real APN that may be used to connect to data network 108.

Virtual APN 112-1 is then configured to determine a real APN 114 to send the access request to. Real APN 114 is configured to interact with data networks 108. In one embodiment, real APN 114 may be specific to different data networks that need to be accessed. For example, real APN 114-1 may access an IP multimedia subsystem, real APN 114-2 may access the Internet, and real APN 114-3 may access a corporate network. Different real APNs 114 are used for different data networks 108 and may have different APN addresses. The real APN may be determined based on the service desired. For example, if access to corporate email is determined, then real APN 114-3 may be determined.

At some point, mobile device 104 may also access data networks 108 through access network 106-2, which may be of a different network technology, such as WiFi. Mobile device 104 may use a different virtual APN to connect to data networks 108 through access network 106-2. In one embodiment, virtual APN 112-2 is used for access network 106-2. Although multiple virtual APNs are described, it will be understood that any number of virtual APNs may be used. For example, if only one virtual APN is being used, mobile device 104 may send the access request to virtual APN 112-1.

For discussion purposes, the access request may be sent to virtual APN 112-2 using the address for it. Virtual APN 112-2 receives the access request and is configured to determine a real APN 114 for the access request. Although virtual APN 112-2 received the request, any real APN 114 may service the access request. Thus, a real APN 114 that serviced a request sent to virtual APN 112-1 may be selected to service this request.

By using virtual APN 112, particular embodiments provide continuity of a connection when mobile device 104 connects through different access networks 106. As described above, mobile device 104 may connect through access network 106-1 to a service 110 through data network 108-1. A session may be created through real APN 114-1. Mobile device 104 may then connect through access network 106-2. In this case, virtual APN 112-2 may receive the access request. Conventionally, different real APNs were assigned to different access networks. This prevented call continuity because session had to be ended when real APNs were changed. However, particular embodiments provide connection continuity in that the connection with service 110 is maintained with real APN 114-1. A connection with mobile device 104 now, however, goes through access network 106-2. In this case, virtual APN 112-2 may determine the real APN 114 to send the access request to and in addition to determine if a session is active with mobile device 104. If a session is active, the same real APN 114-1 is assigned to the access request and the connection with service 110 is maintained. Once the assignment to real APN 114-1 is made, then the handoff from access network 106-1 to access network 106-2 may be performed. Continuity of the connection with service 110 is maintained even though mobile device 104 has attached through different data access networks 106.

Figure 2:
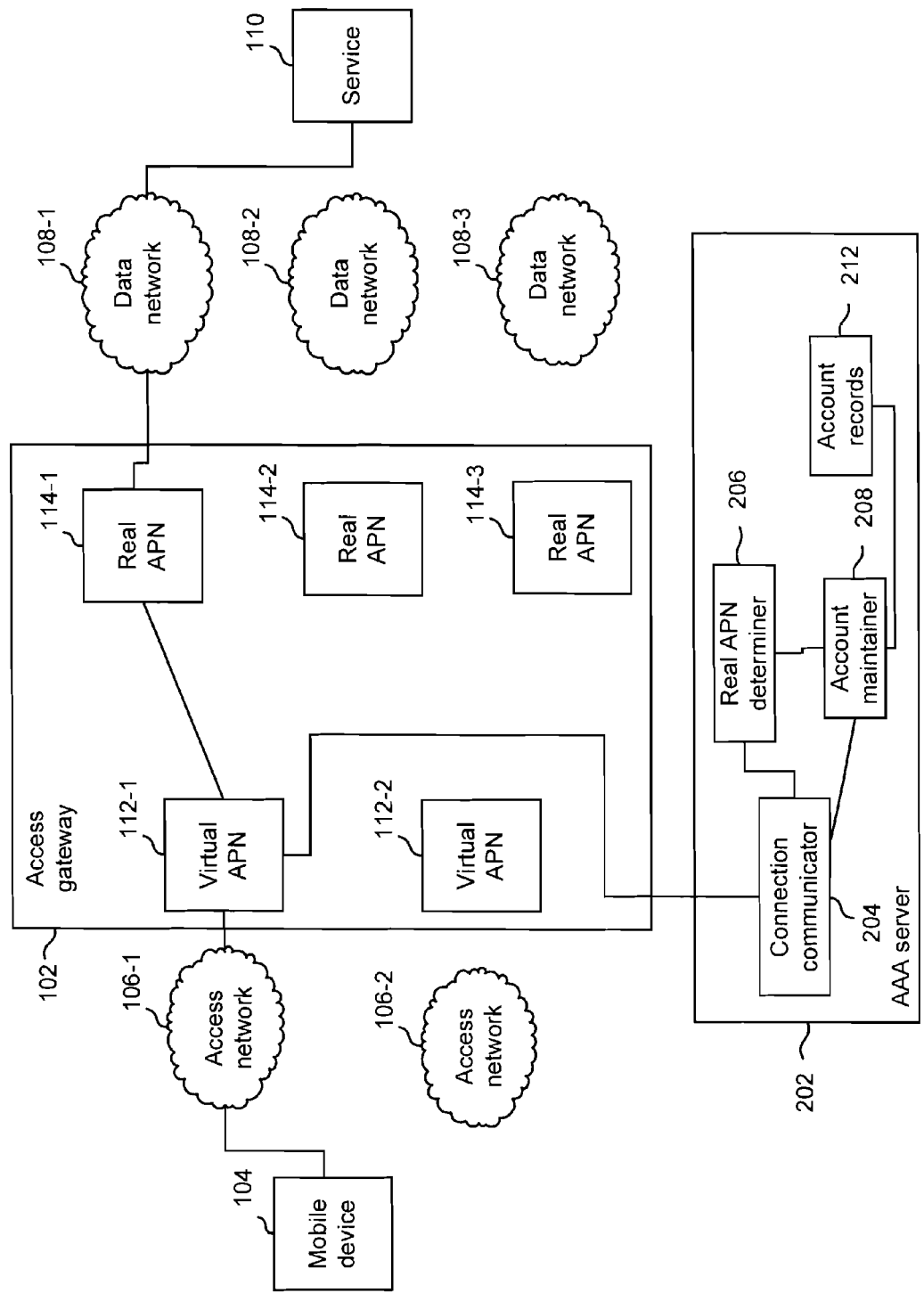
FIG. 2 shows a more detailed example of the system shown in FIG. 1.

FIG. 2 shows a more detailed example of the system shown in FIG. 1. In this example, a first access request for service 110 is received. The access request may be sent through access network 106-1 and is received at virtual APN 112-1. Access gateway 102 may then send a request to AAA server 202. AAA server 202 is configured to provide authentication, authorization, and accounting services.

A connection communicator 204 at AAA server 202 receives an authentication request from access gateway 102. The authentication request may be a remote authentication dial-in user service (RADIUS) request. However, other protocols may also be used, such as DIAMETER, etc. The authentication request includes the virtual APN that was sent in the access request and also may include identification information for mobile device 104. The identification information may be username domain.com. "Username" may be an identifier for mobile device 104 and domain may be a domain for a service provider. Real APN determiner 206 is then configured to determine a real APN. For example, a real APN address for real APN 114-1 is determined for this access request.

Account manager 208 may maintain an accounting record 112 for the access request. For example, an accounting record 112 may be created for a session with service 110. This may be used for billing purposes.

Connection communicator 204 can then respond to the authentication request. The response may include the real APN address in addition to any authentication information that is needed. Virtual APN 112-1 may then use the real APN address to determine which real APN 114 should be used. For example, a session with service 110 is then created using real APN 114-1.

Mobile devices 104 may access a different access network 106 at some point during the connection with service 110. For example, mobile device 104 may connect to access network 106-2. In one example, mobile device 104 may move from a mobile communications network to a WiFi network, such as the user may be using a cellular phone on a cellular network while driving home and then when the user enters his/her home, the cellular phone may connect to a home WiFi network.

Figure 3:
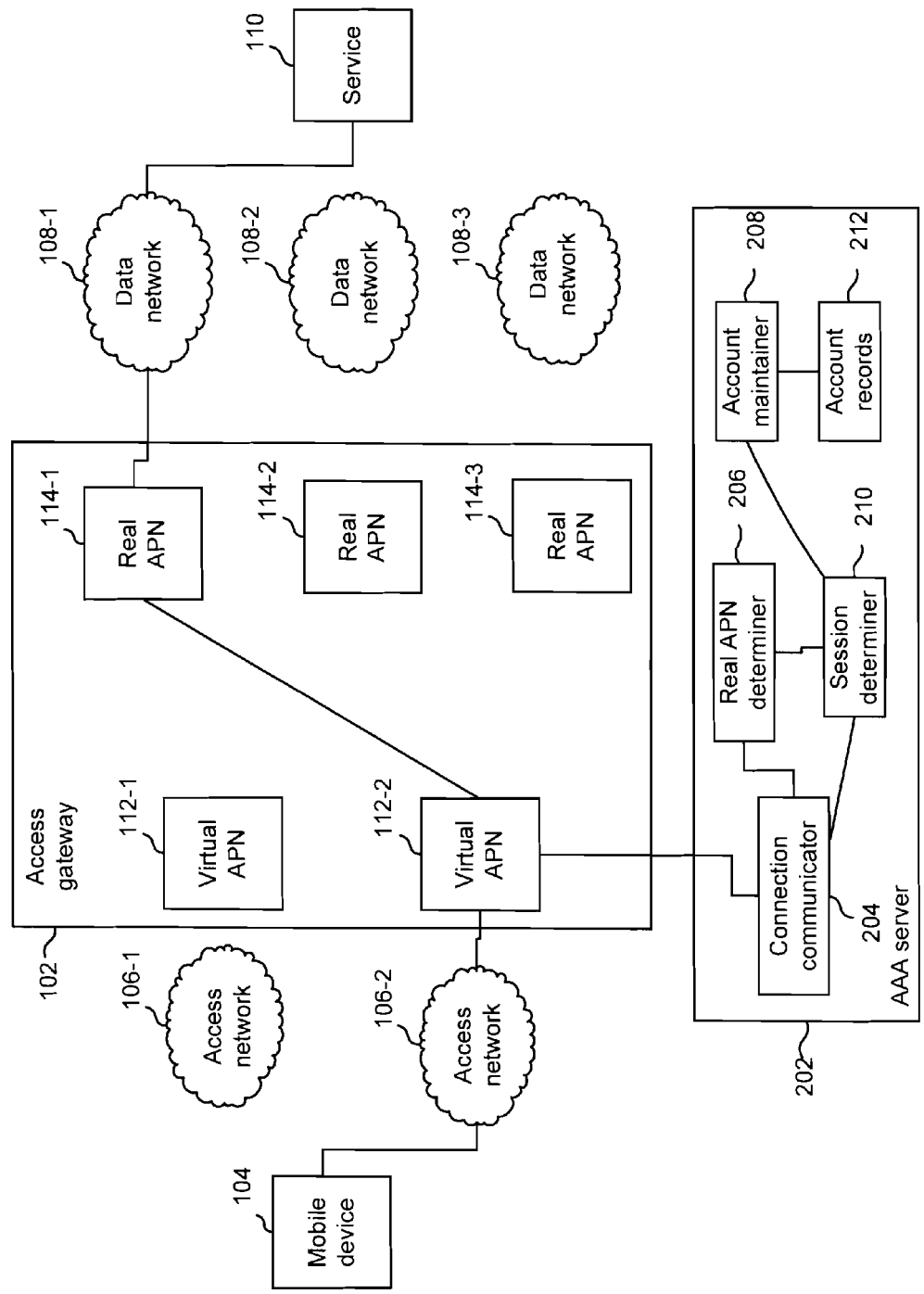
FIG. 3 depicts a more detailed example of the system shown in FIG. 1 when a different access network is connected with by a mobile device.

FIG. 3 depicts a more detailed example of the system shown in FIG. 1 when a different access network is connected with by mobile device 104. Mobile device 104 may send an access request through access network 106-2 when it attaches to the network. The access request may be sent to a virtual APN address for virtual APN 112-2. Virtual APN 112-2 may be the virtual APN for the WiFi network. In this case, the virtual APN is different; however, in other embodiments, the access request may be sent to the same virtual APN as the access request sent through access network 106-2.

Access gateway 102 may then send an authentication request to AAA server 202. Connection communicator 204 receives the request and real APN determiner 206 determines a real APN address for the request. In determining the real APN address, AAA server 202 determines if mobile device 104 is currently participating in a session with service 110. For example, a session determiner 210 uses the identifier, which may be an IP address, telephone number, etc., for mobile device 104 to determine if a session is active. In one example, session determiner 302 uses an account maintainer 208 to search through accounting records 212 to determine if a session is active. When a session is started with service 110, an accounting record may be generated for billing purposes. When the session is ended, an account stop is received and that accounting record is ended. For example, a record is started and stopped for each session that is created and ended. However, if account stop has not been received for an accounting record, then it may be assumed that the session is still active with service 110. The identification information for mobile device 104 may be the same across access network 106-1 and access network 106-2. This may allow account maintainer 208 to determine the session that is active for mobile device 104 because the active account record would be opened with the same identifier. Although this method of determining if a session is active is described, it will be understood that other methods may be used. For example, other accounting information may be used to determine an active session.

If a session is active, session determiner 302 determines information for the session and sends it to connection communicator 204. For example, an identifier for the session is determined. The identifier may uniquely identify the session and may be a sequence number or other information. Connection communicator 204 can then determine a real APN address for the session and return it to access gateway 102 along with any authentication information.

Virtual APN 112-2 can then assign the access request to real APN 114-1. Thus, the session between real APN 114-1 and service 110 can be maintained through data network 108-1. A handoff from access network 106-1 to access network 106-2 may then be performed. Thus, mobile device 104 maintains continuity with a connection for service 110.

In one embodiment, the system may be thought of as two different sides of a connection. On a service side, a connection between real APN 114 and service 110 is maintained and not broken. Thus, a session on the service side can be maintained through keeping the same real APN 114. On a mobile device side, a handoff from access network 106-1 to access network 106-2 may be performed. As shown, the connection among mobile device 104, virtual APN 112-1, and real APN 114-1 is broken. However, a new connection is among mobile device 104, virtual APN 114-2, and real APN 114-1 is created. The handoff between access network 106-1 and access network 106-2 may be seamless and does not affect a connection between real APN 114 and service 110.

Figure 4:
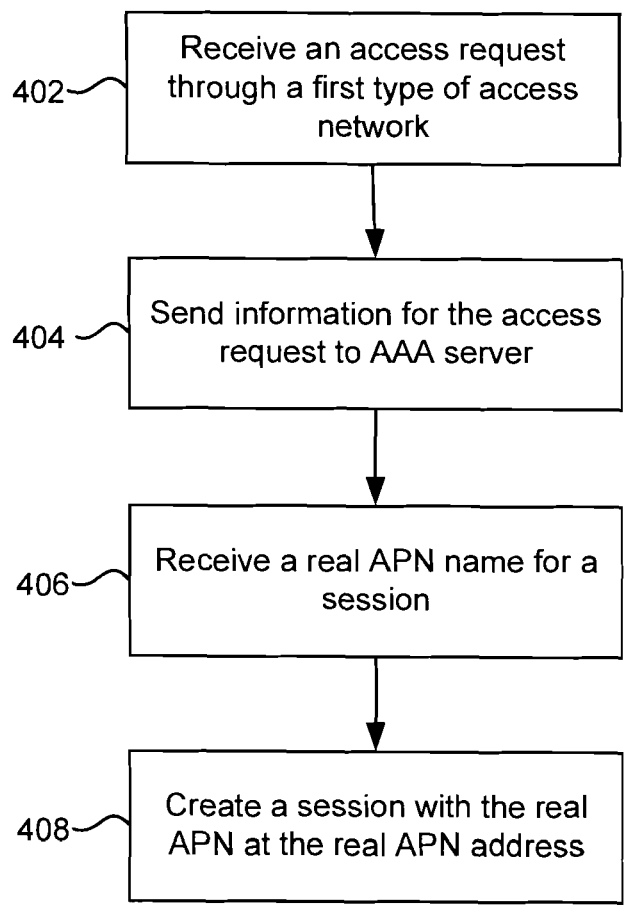
FIG. 4 depicts an example of a method for creating a first session with a real APN.

FIG. 4 depicts an example of a method for creating a first session with a real APN 114. In one embodiment, the process may be performed using access gateway 102.

Step 402 receives an access request through a first type of access network 106. For example, mobile device 104 may connect through a mobile communications network.

Step 404 sends information for the access request to AAA server 202. The information may include identification information for mobile device 104, a cell ID for access network 106-1, and the address for the virtual APN that was sent in the access request.

Step 406 receives a real APN address for a session. For example, the virtual APN address is translated to a real APN address.

Step 408 then creates a session with the real APN 114 at the real APN address.

Figure 5:
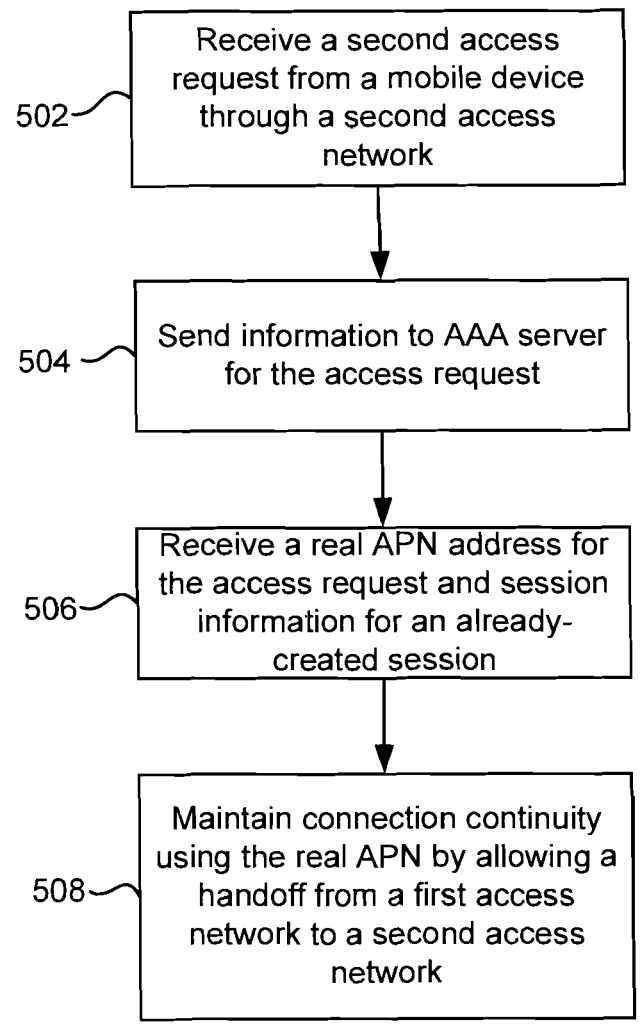
FIG. 5 depicts an example of a method for providing connection continuity.

FIG. 5 depicts an example of a method for providing connection continuity. Step 502 receives a second access request from mobile device 104 through a second access network 106-2. For example, the second access request may be received through a WiFi access network.

Step 504 sends information to AAA server 202 for the access request. For example, the same type of information may be sent as the first message sent in step 404 of FIG. 4—an identifier for mobile device 104, a cell ID for access network 106-2 and the virtual APN address.

Step 506 receives a real APN address for the access request and session information for an already-created session. The real APN address is used to determine real APN 114-1 and the session information is used to determine that a session has already been created for mobile device 104.

Step 508 maintains connection continuity using a real APN 114-1 by allowing a handoff from access network 106-1 to access network 106-2. The connection through access network 106-2 is connected to the already created session with service 110 through real APN 114-1.

Figure 6:
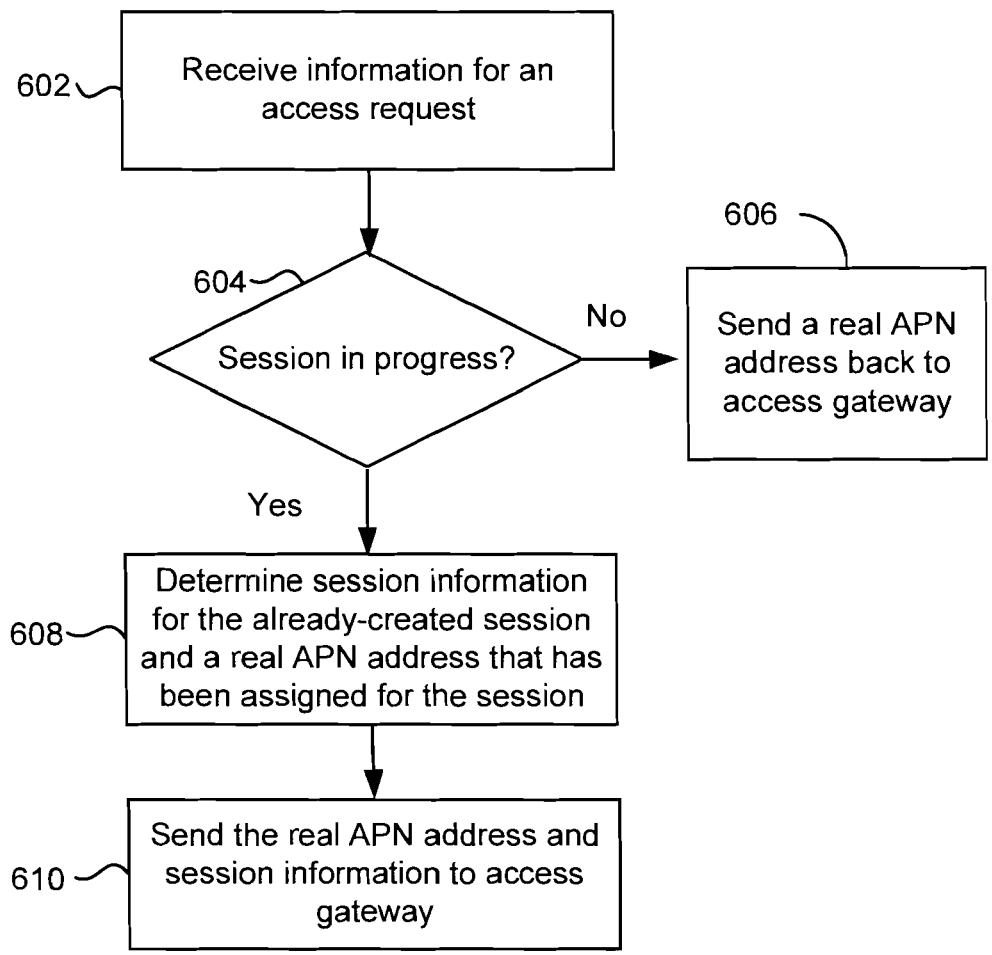
FIG. 6 depicts an example of a method for providing connection continuity at a AAA server.

FIG. 6 depicts an example of a method for providing connection continuity at AAA server 202. Step 602 receives information for an access request. Step 604 determines if a session is already in progress. For example, identification information and accounting information for mobile device 104 may be used to determine if a session is in progress. Because AAA server 202 processes authentication and accounting information, it is ideal to handle the authentication for access to a network and also to determine if a session is in progress (which affects which real APN is assigned).

If a session is not in progress, step 606 sends a real APN address back to access gateway 102. The real APN 114 that is selected may be based on many factors. For example, a real APN that includes the most available resources, the real APN that may be associated with handling sessions for access network 106, etc. may be determined.

If a session is in progress, step 606 determines session information for the already-created session and a real APN address that has been assigned for the session. Step 608 then sends the real APN address and session information to access gateway 102.

Figure 7:
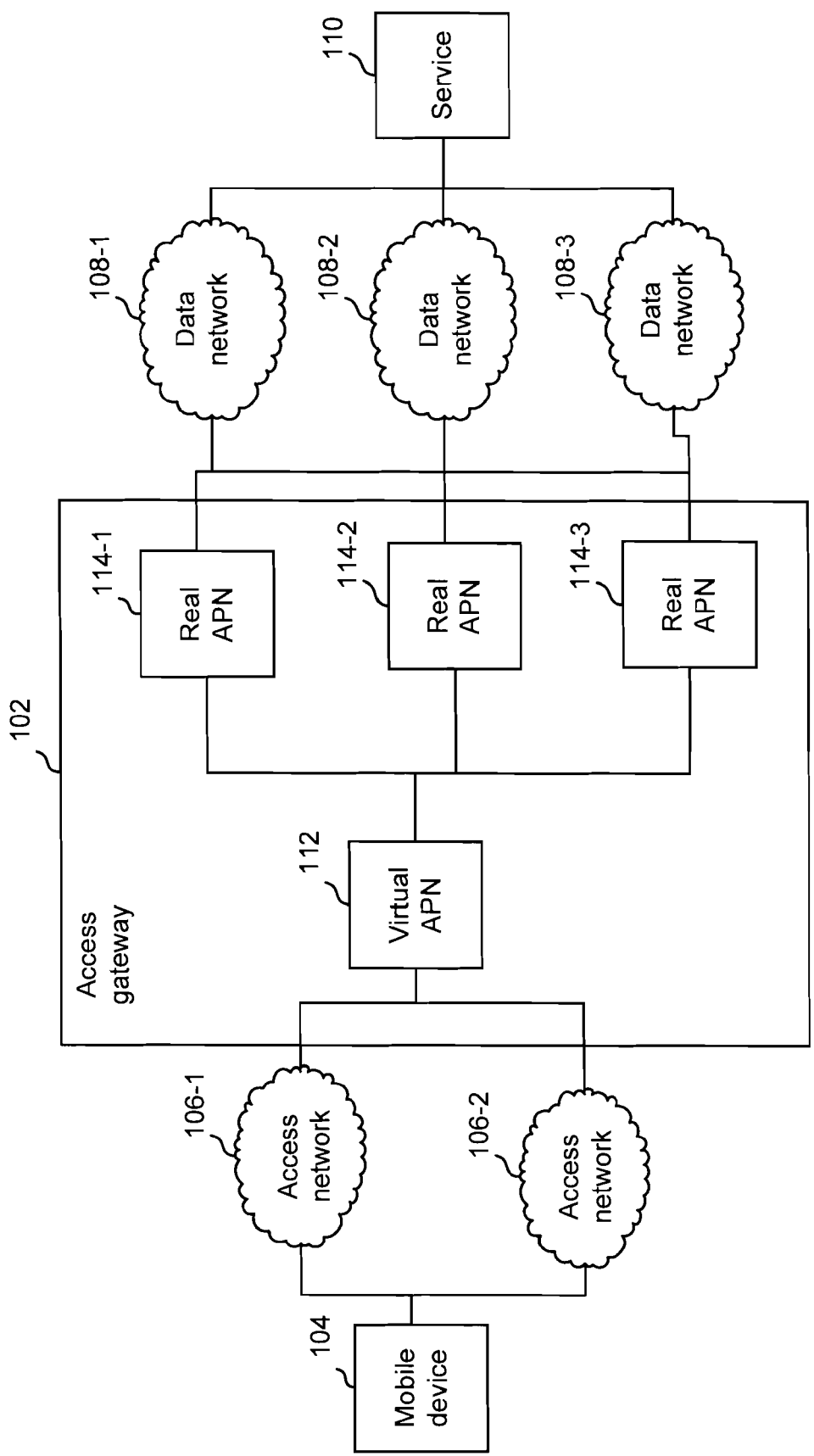
FIG. 7 shows another embodiment of a system that may be used to provide connection continuity.

FIG. 7 shows another embodiment of a system that may be used to provide connection continuity. As shown, a single virtual APN 112 is used. In this case, mobile device 104 may use the same virtual APN address whether or not it is connecting through access network 106-1 or access network 106-2.

Virtual APN 112-2 can then assign a real APN 114. In this case, multiple virtual APN addresses do not need to be configured on mobile device 104. This may simplify configuration of mobile device 104.

Although the description has been described with respect to particular embodiments thereof, these particular embodiments are merely illustrative, and not restrictive. Although a mobile communications network and WiFi network are described, it will be understood that other networks may be used.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method comprising: receiving at a first virtual access point name, from a mobile device, a first access request for a service through a first access network, wherein the first access request includes a virtual access point address, which is subsequently translated to a real access point address associated with a real access point, and an identifier for the mobile device; creating a session using the real access point, the session having a session identifier associated therewith for uniquely identifying the session; receiving at a second virtual access point name, from the mobile device, a second access request for the service through a second access network including the session identifier allowing identification of a session that is still alive; determining that the session is still active for the service based upon the session identifier; and maintaining continuity of the session by connecting the mobile device to the real access point through the second access network using the session identifier.

2. The method of claim 1, further comprising:
sending a request to a device with information for the second access request; and
receiving a response from the device indicating the determined session that was created and the real access point to use.

3. The method of claim 2, wherein the request is an authentication request to an AAA server.

4. The method of claim 1, further comprising performing a handoff from a connection through the first access network to a connection through the second access network for the mobile device while maintaining continuity of the session.

5. A method comprising: receiving at a first virtual access point name, from a network device, a first access request for a service, the first access request being sent by a mobile device through a first communication medium, wherein the first access request includes a virtual access point address, which is subsequently translated to a real access point address associated with a real access point, and an identifier for the mobile device; sending the real access point address to the network device to allow the network device to create a session using the real access point address, the session having a session identifier associated therewith for uniquely identifying the session; receiving at a second virtual access point name, from the network device, a second access request for the mobile device, the second access request being sent by the mobile device through a second communication medium including the session identifier allowing identification of a session that is still alive; determining that the session is still active for the service at the real access point based upon the session identifier; and sending the real access point address and information for the session that is active to the network device to allow the network device to maintain continuity of the session by connecting the mobile device to the real access point through the second communication medium using the session identifier.

6. The method of claim 5, further comprising:
starting an accounting record for the service when the first access request is received;
determining if the accounting record for service has been closed; and
determining that the session is still active if the accounting record has not been closed.

7. An apparatus comprising: one or more processors; and logic encoded in one or more tangible media for execution by the one or more processors and when executed operable to: receive at a first virtual access point name, from a mobile device, a first access request for a service through a first access network, wherein the first access request includes a virtual access point address, which is subsequently translated to a real access point address associated with a real access point, and an identifier for the mobile device; create a session using the real access point in a plurality of real access points for the mobile device, the session having a session identifier associated therewith for uniquely identifying the session; receive at a second virtual access point name, from the mobile device, a second access request for the service through a second access network including the session identifier allowing identification of a session that is still alive; determine that the session is still active for the service based upon the session identifier; and maintain continuity of the session by connecting the mobile device to the real access point through the second access network using the session identifier.

8. The apparatus of claim 7, wherein the logic when executed is further operable to:
send a request to a device with information for the second access request; and
receive a response from the device indicating the determined session that was created and the real access point to use.

9. The apparatus of claim 8, wherein the request is an authentication request to an AAA server.

10. The apparatus of claim 7, wherein the logic when executed is further operable to perform a handoff from a connection through the first access network to a connection through the second access network for the mobile device while maintaining continuity of the session.

11. An apparatus comprising: one or more processors; and logic encoded in one or more tangible media for execution by the one or more processors and when executed operable to: receive at a first virtual access point name, from a network device, a first access request for a service, the first access request being sent by a mobile device through a first communication medium, wherein the first access request includes a virtual access point address, which is subsequently translated to a real access point address associated with a real access point, and an identifier for the mobile device; send the real access point address to the network device to allow the network device to create a session using the real access point address, the session having a session identifier associated therewith for uniquely identifying the session; receive at a second virtual access point name, from the network device, a second access request for the mobile device, the second access request being sent by the mobile device through a second communication medium including the session identifier allowing identification of a session that is still alive; determine that the session is still active for the service at the real access point based upon the session identifier; and send the real access point address and information for the session that is active to the network device to allow the network device to maintain continuity of the session by connecting the mobile device to the real access point through the second communication medium using the session identifier.

12. The apparatus of claim 11, wherein the logic when executed is further operable to:
   start an accounting record for the service when the first access request is received;
   determine if the accounting record for service has been closed; and
   determine that the session for the service is still active if the accounting record has not been closed.

13. An apparatus comprising: means for receiving at a first virtual access point name, from a mobile device, a first access request for a service through a first access network, wherein the first access request includes a virtual access point address, which is subsequently translated to a real access point address associated with a real access point, and an identifier for the mobile device; means for creating a session using the real access point, the session having a session identifier associated therewith for uniquely identifying the session; means for receiving at a second virtual access point name, from the mobile device, a second access request for the service through a second access network including the session identifier allowing identification of a session that is still alive; means for determining that the session is still active for the service based upon the session identifier; and means for maintaining continuity of the session by connecting the mobile device to the real access point through the second access network using the session identifier.

14. An apparatus comprising: means for receiving at a first virtual access point name, from a network device, a first access request for a service, the first access request being sent by a mobile device through a first communication medium, wherein the first access request includes a virtual access point address, which is subsequently translated to a real access point address associated with a real access point, and an identifier for the mobile device; means for sending the real access point address to the network device to allow the network device to create a session using the real access point address, the session having a session identifier associated therewith for uniquely identifying the session; means for receiving at a second virtual access point name, from the network device, a second access request for the mobile device, the second access request being sent by the mobile device through a second communication medium including the session identifier allowing identification of a session that is still alive; means for determining that the session is still active for the service at the real access point based upon the session identifier; and means for sending the real access point address and information for the session that is active to the network device to allow the network device to maintain continuity of the session by connecting the mobile device to the real access point through the second communication medium using the session identifier.

* * * * *